F. E. WILLIAMS.
FRICTION BAND BRAKE.
APPLICATION FILED MAR. 6, 1917.

1,353,370. Patented Sept. 21, 1920.

WITNESSES:
W. F. Andres
F. D. Jones

INVENTOR
Frank E. Williams
BY
Oliver S. Barnum
ATTORNEY

UNITED STATES PATENT OFFICE.

FRANK E. WILLIAMS, OF ALHAMBRA, CALIFORNIA.

FRICTION BAND-BRAKE.

1,353,370. Specification of Letters Patent. Patented Sept. 21, 1920.

Application filed March 6, 1917. Serial No. 152,835.

*To all whom it may concern:*

Be it known that I, FRANK E. WILLIAMS, a citizen of the United States, residing in the city of Alhambra, county of Los Angeles, State of California, have invented new and useful Improvements in Friction Band-Brakes, of which the following is a specification.

My invention relates to a combination friction band brake gear designed to be constant in action, by which a weight or load may be suspended in any desired position, and raised or lowered at will; so constructed that the constant brake resistance may be easily overcome by properly applied traction, and the brake automatically hold the weight or load again in a fixed position as soon as traction ceases.

The objects of my invention are to provide a means by which a weight, as a geographical globe in a school room, may be suspended in an out-of-the-way position; drawn down to any desired level for demonstration purposes, and replaced in out-of-the-way position, and to do this by a device which is attractive in appearance, simple, effective and cheap.

I attain these objects by the mechanism illustrated in the accompanying drawings, in which—

Figures 1, 2:
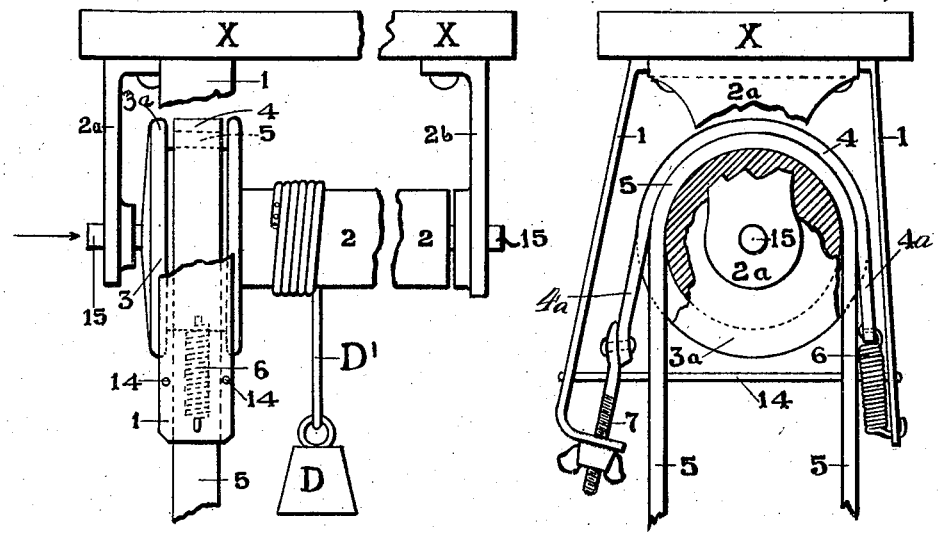
Figure 1 is a front elevation of the complete invention attached in a fixed position overhead.
Fig. 2 is a cross section on like scale, looking in the direction of the arrow in Fig. 1.

Referring particularly to the drawings, X represents a ceiling joist or other fixed overhead surface to which the device is permanently attached.

My invention embraces a complete band brake gear, and comprises a shaft 2 with pulley 3 attached thereto, suspended in ordinary brackets $2^a$ and $2^b$ by means of bearing tips 15; the pulley 3 is provided with flanges $3^a$, between which passes brake band $4^a$ and traction belt 5; a brake band holder 1, attached to X and formed to partially surround pulley 3; and a traction belt 5.

In Fig. 1 the brake band holder 1 is cut out, exposing brake band 4 within flanges $3^a$ of pulley 3; also showing traction belt 5 lying between brake band 4 and pulley 3.

Brake band $4^a$ comprises three parts for the purposes of this invention, viz. (1) a resilient medium 6, as a coil spring, one extremity of which is attached to a flexible band 4, and the other end attached to the proximate end of holder 1; (2) a flexible band 4, preferably of leather; and (3) an adjustable terminal 7, as a threaded bar, one end of which is attached to flexible band 4, and the other end adapted to pass through a hole in the distal end of holder 1, and provided with a suitable nut to operate thereon.

Holder 1 is provided with parallel rods 14 between the ends thereof for the sake of rigidity; said rods also serving as guides to prevent traction belt 5 riding flanges $3^a$.

Under normal operating conditions the weight or load D exerts traction on shaft 2 through flexible connection $D^1$. This traction is normally overcome by constant brake friction between band $4^a$ and pulley 3, and adjustment of tension of band $4^a$ by means of rod 7 provides a safety margin of friction over and above that necessary to overcome said traction by load D.

To revolve shaft 2 traction is made by endless belt 5 in either direction, and when said traction is sufficient to overcome the normal brake friction and safety margin, then pulley and shaft revolve on bearings 15 and weight D is raised or lowered correspondingly.

Be it understood that variation in load D may be compensated for by variation in tension of brake band $4^a$ through operation of adjustable terminal 7. That is, the greater the tension on brake band $4^a$ the greater the friction on pulley 3 to off-set increase in load D; and vice versa.

Be it further borne in mind that although traction belt 5 lies between band $4^a$ and pulley 3, the frictional relation between said band $4^a$ and pulley 3 is not appreciably affected thereby.

It will be observed that traction on belt 5 in one direction will operate to increase the length of brake band $4^a$ (due to the friction between belt 5 and band $4^a$ and to the resiliency in terminal 6), thus in an appreciable degree lessening the tension of band $4^a$ and simultaneously lessening the friction of band 4 on pulley 3. At the same time the friction between belt 5 and pulley is not appreciably affected and pulley revolves on application of traction on belt 5.

Conversely, traction on belt 5 in the opposite direction has no equivalent lessening of tension of brake band 4ᵃ, because of the rigidity of its attachment through terminal 7.

It appears therefore, that less traction on belt 5 is necessary to revolve pulley 3 in one direction than in the other. For obvious reasons, therefore, the load D is suspended to exert traction on pulley 3 in the direction of greatest difficulty to operate the same. In other words, the brake load or inertia existing when brake is in operation and load is suspended, is arranged to be more easily overcome by traction on belt 5 in a direction to lift load D than to lower the same.

It also appears that by simple modification of the brake band holder 1 to more or less surround pulley 3, the frictional surface of band 4ᵃ on pulley 3 may be increased or decreased.

Figure 4:
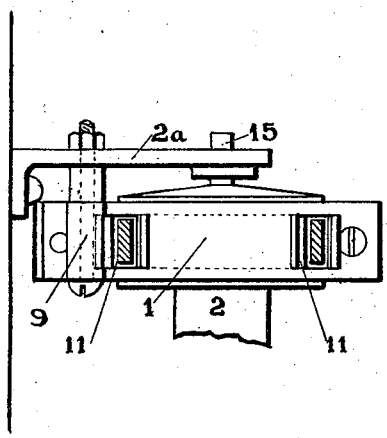
Fig. 4 shows a view of said modification in the direction of the arrow in Fig. 3.
Figure 3:
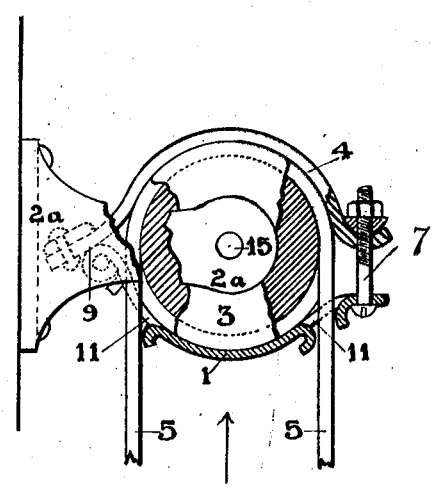
Fig. 3 shows a cross-section of a modification of my invention.

In the modification (Figs. 3 and 4) the holder 1, in conjunction with band 4ᵃ entirely encircles pulley 3. Traction belt 5, after leaving pulley 3 on either side thereof, passes through slots 11, 11 provided in holder 1. In this construction holder 1, at its junction with one extremity of band 4ᵃ, is attached by any simple mechanical means to bracket 2ᵃ as at 9, this attachment serving to prevent holder 1 and band 4ᵃ from revolving with pulley 3. Threaded bar 7 and nut operating thereon serves to increase or diminish tension of band 4ᵃ, as in previous described construction. Holder 1, preferably of spring metal, is formed on a larger radius than is pulley 3, thus providing in itself the resiliency necessary, and so serving in lieu of coil spring 6.

This modification is applicable to ordinary window shade brackets and may serve as a window shade adjuster, the shade in its proper hanger being the equivalent of load D.

Having described my invention I claim as new and desire to obtain Letters Patent of the United States upon—

In a constant friction band brake a combination of a revolving drum and brake pulley attached thereto, all properly journaled; a band brake holder partially encircling said brake pulley; a flexible brake band bearing on said pulley and permanently attached to said holder at one end by means of an interposed coil spring, said coil spring being placed on the side of said pulley corresponding to the side of said drum where suspended load would tend to unwind the same, the other end of said brake band being attached to said holder by means of an interposed threaded shaft which passes through a perforation in said holder and provided with a winged nut at the extremity thereof to operate thereon; and a flat traction belt riding said pulley between said flexible brake band and said pulley, all substantially as set forth.

In testimony whereof, I have signed my name to this specification in the presence of two subscribing witnesses.

FRANK E. WILLIAMS.

Witnesses:
 F. D. JONES,
 OLIVER S. BARNUM.